United States Patent
Sampson

(10) Patent No.: US 6,796,131 B2
(45) Date of Patent: Sep. 28, 2004

(54) ENVIRONMENTAL CONTROL SYSTEM

(75) Inventor: Bernard Francis Sampson, Bridgewater (GB)

(73) Assignee: Honeywell Normalair-Garrett (Holdings) Limited (GB)

( * ) Notice: Subject to any disclaimer, the term of this patent is extended or adjusted under 35 U.S.C. 154(b) by 0 days.

(21) Appl. No.: 10/246,157

(22) Filed: Sep. 18, 2002

(65) Prior Publication Data

US 2004/0051002 A1 Mar. 18, 2004

(30) Foreign Application Priority Data

Sep. 20, 2001 (GB) .............................................. 0122672

(51) Int. Cl.$^7$ ................................................. F25B 9/00
(52) U.S. Cl. ........................... 62/87; 244/118.5; 244/58
(58) Field of Search ................................ 244/118.5, 57, 244/58, 53 B; 60/782, 806; 454/71, 76, 113; 62/87, 86

(56) References Cited

U.S. PATENT DOCUMENTS

| | | | |
|---|---|---|---|
| 2,477,932 A | * | 8/1949 | King |
| 3,981,466 A | * | 9/1976 | Shah |
| 4,261,416 A | * | 4/1981 | Hamamoto |
| 4,934,154 A | * | 6/1990 | Altoz et al. |
| 5,137,230 A | * | 8/1992 | Coffinberry |
| 5,490,645 A | * | 2/1996 | Woodhouse |
| 5,860,283 A | | 1/1999 | Coleman et al. ................ 62/87 |
| 5,911,388 A | * | 6/1999 | Severson et al. |
| 5,967,461 A | * | 10/1999 | Farrington |
| 6,216,981 B1 | * | 4/2001 | Helm |
| 6,283,410 B1 | * | 9/2001 | Thompson |
| 6,527,228 B2 | * | 3/2003 | Mitani |

FOREIGN PATENT DOCUMENTS

| | | |
|---|---|---|
| EP | 0 738 655 | 10/1996 |
| EP | 1 129 941 | 9/2001 |
| GB | 2 273 349 | 6/1994 |

* cited by examiner

Primary Examiner—Tien Dinh
(74) Attorney, Agent, or Firm—MacMillan, Sobanski & Todd, LLC

(57) ABSTRACT

An environmental control system has a cooling loop including a cooling turbine which, in use, drives a compressor, and an intercooler apparatus, for cooling air compressed by the compressor prior to the air being expanded and cooled over the cooling turbine, and a heat exchanger to which at least a proportion of the cooled and expanded air from the turbine is fed to cool a heat load, and wherein, in a first mode of operation, the cooling loop is closed so that the air circulates around the closed loop from the compressor to the intercooler apparatus to the cooling turbine, and thence to the heat exchanger, and back to the compressor, and in a second mode of operation the cooling loop is open to allow working fluid to pass from the system whilst further working fluid is introduced into the cooling loop, and wherein an ambient air inlet valve is provided to provide for the admission of ambient air to the cooling loop, when the system is operating in the second mode of operation.

14 Claims, 1 Drawing Sheet

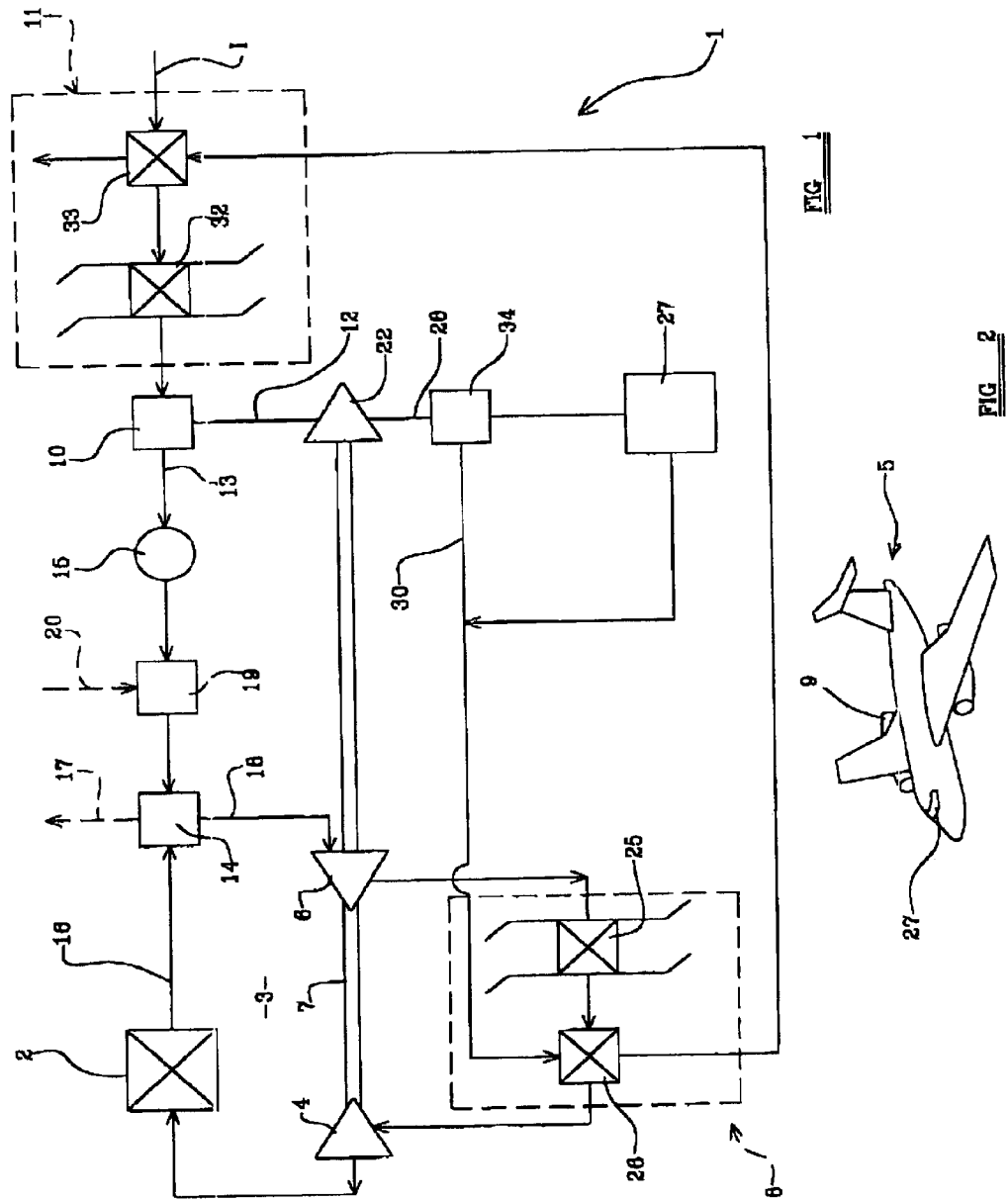

ENVIRONMENTAL CONTROL SYSTEM

BACKGROUND TO THE INVENTION

This invention relates to an environmental control system which may be for use on board an aircraft.

DESCRIPTION OF THE PRIOR ART

More particularly the invention relates to an improvement in an environmental control system which is generally as described in EP-A-0738655. In the earlier proposal, an environmental control system is described which includes a cooling turbine connected in use, to a compressor, with there being a driving device for providing drive power to the cooling turbine-compressor combination, and an intercooler apparatus, wherein, in a first mode of operation, the air circulates around a closed cooling loop from the compressor to the intercooler apparatus to the cooling turbine, thence along a cooling pass to cool equipment or a volume, and back to the compressor, the system including a mode valve operable in a second mode of operation to open the loop to allow air to vent to ambient during or after the cooling pass whilst further working fluid is introduced into the loop.

Where the prior proposal is applied to an aircraft, when such a system is operating in the second, open loop, mode of operation, which will typically occur when the aircraft is on the ground, fresh bleed air from an auxiliary power unit (APU) or an aircraft engine is supplied both to a power turbine (which is a driving device which drives the cooling turbine-compressor combination) and to the open loop, i.e. to the inlet of the compressor, by way of a pressure regulating valve. Thus a large mass flow of air is required from the APU and/or engine for driving the power turbine and for providing air to the open cooling loop of the system, and effectively to cool such a large mass flow of air requires large pre-coolers and an increased supply of coolant air to the pre-coolers. Pre-coolers of increased size are not, of course, readily accommodated when space is limited e.g. on an aircraft.

SUMMARY OF THE INVENTION

According to one aspect of the present invention, we provide an environmental control system having a cooling loop including a cooling turbine which, in use, drives a compressor, and an intercooler apparatus, for cooling air compressed by the compressor prior to the air being expanded and cooled over the cooling turbine, and a heat exchanger to which at least a proportion of the cooled and expanded air from the turbine is fed to cool a heat load, and wherein, in a first mode of operation, the cooling loop is closed so that the air circulates around the closed loop from the compressor to the intercooler apparatus to the cooling turbine, and thence to the heat exchanger, and back to the compressor, and in a second mode of operation the cooling loop is open to allow air to pass from the system whilst further air is introduced into the cooling loop, and wherein an ambient air inlet valve is provided to provide for the admission of ambient air to the cooling loop, when the system is operating in the second mode of operation.

When the system is operating in the second operational mode, all of the high pressure air provided by the APU and/or engine may be used for purposes other than in the cooling loop, for example for providing drive to the cooling turbine-compressor combination in the cooling loop.

Usually a pressure regulating valve is provided between the cooling loop and a high pressure inlet for the high pressure air from the APU and/or engine, the pressure regulating valve permitting the introduction of high pressure air into the cooling loop when the pressure in the cooling loop is below a predetermined pressure e.g. to make up losses to the cooling loop when the system is operating in the first operational mode of operation.

Desirably, the ambient air inlet valve is provided downstream of the pressure regulating valve.

The cooling loop may be closed and opened by a mode valve in the cooling loop which may be provided upstream of the mode valve and downstream of the pressure regulating valve where provided.

Because of unavoidable cycle inefficiencies, the system may include a driving device to provide additional drive power to drive the compressor, such as a power turbine over which high pressure air is passed, the power turbine and the cooling turbine and the compressor being provided on a common shaft and being rotatable together. High pressure air for the power turbine may provided to the power turbine from upstream of the pressure regulating valve.

Cooled and expanded air from the power turbine may be fed to the intercooler apparatus to cool compressed air in the cooling loop, and the intercooler apparatus may include a ram air heat exchanger for cooling the compressed air.

Cooled and expanded air from the power turbine may additionally or alternatively be fed to a pre-cooling apparatus to pre-cool high pressure air from an inlet for high pressure air to the system and the pre-cooling apparatus may include a ram air heat exchanger.

According to a second aspect of the invention we provide an aircraft including a air conditioning system having a cooling loop including a cooling turbine which, in use, drives a compressor, and an intercooler apparatus, for cooling air compressed by the compressor prior to the air being expanded and cooled over the cooling turbine, and a heat exchanger to which at least a proportion of the cooled and expanded air from the turbine is fed to cool a heat load, and wherein, in a first mode of operation, the cooling loop is closed so that the air circulates around the closed loop from the compressor to the intercooler apparatus to the cooling turbine, and thence to the heat exchanger, and back to the compressor, and in a second mode of operation the cooling loop is open to allow air to pass from the system whilst further air is introduced into the cooling loop, and wherein an ambient air inlet valve is provided to provide for the admission of ambient air to the cooling loop, when the system is operating in the second mode of operation.

BRIEF DESCRIPTION OF THE DRAWINGS

The invention will now be described with reference to the accompanying drawings in which:—

FIG. 1 is a diagrammatic view of an environmental control system in accordance with the present invention;

FIG. 2 is an illustrative view is an aircraft having an environmental control system in accordance with the present invention.

DESCRIPTION OF THE PREFERRED EMBODIMENTS

Referring to the drawings an environmental control system is indicated generally at 1, which includes a heat exchanger 2 for cooling a heat load, which typically would be a heat load produced by one or more avionics systems of an aircraft 5. The heat exchanger 2 is in a cooling loop 3, which includes an expansion turbine 4 over which a working fluid, in this case pressurised air, is expanded and hence cooled, and a compressor 6 to which the compressed air is fed, the compressor 6 and expansion cooling turbine 4 being arranged on a common shaft 7 so that as the cooling turbine 4 is rotated by the pressurised air, as the pressurised air is expanded and cooled, the compressor 6 is driven to effect further compression of the pressurised air supply.

Further included in the cooling loop 3 is an intercooler apparatus 8 which will be described in more detail below, the intercooler apparatus 8 cooling the pressurised and hot air from the compressor 6 prior to its expansion over the cooling turbine 4.

The pressurised air supply is in this example one of bleed air from an aircraft engine 9 and/or air from an auxiliary power unit or APU, which passes from an inlet I to the cooling loop 3 via a pre-cooler apparatus 11, again which will be described in more detail below, and via a pressure regulating valve 15 which regulates the pressure in the cooling loop 3.

In this example, pressurised air is also fed from the inlet I, after pre-cooling, to a power turbine 22 which is carried on the shaft 7 on which the compressor 6 and cooling turbine 4 are provided, to deliver extra drive power to the compressor 6 and cooling turbine 4 where required, the pre-cooled pressurised air supply being delivered to the power turbine 22 via a line 12, such flow being controlled by a control valve 10, with pre-cooled pressurised air for the cooling loop 3 being delivered from the control valve 10 to the pressure regulating valve 15, via a line 13.

The cooling loop 3 further includes a mode valve 14 to which air from the heat exchanger 2 passes via a line 16, the mode valve 14 being operable in a first mode of operation, e.g. when the aircraft 5 is in normal flight and an adequate supply of pressurised air is available at inlet I for cooling the heat load 2, or when an APU is operable to deliver an adequate supply of pressurised air to the inlet I, to deliver the air from the heat exchanger 2 to a line 18 back to the compressor 6 for recycling, so that the cooling loop 3 is closed.

In a second mode of operation when an inadequate supply of pressurised air is available at the inlet I, for example when the aircraft 5 is on the ground and its engine or engines 9 and/or an APU where operating, is delivering an insufficient supply of pressurised air to the inlet I for cooling the heat load, the cooling loop 3 may be opened.

This is achieved as the mode valve 14 receiving the air from the avionics heat load 2 provides for exhaustion to ambient air of at least some of the air by way of exit line 17.

It will be appreciated that when operating in the second mode with the cooling loop 3 open, the system 1 will demand a significant volume of air from the engine 9 and/or APU, which will require cooling.

In accordance with the invention, to reduce the cooling demand for such a high volume of air, an ambient air inlet valve indicated at 19 is provided in the line 13 between control valve 10 and the mode valve 14. This further valve 19 is preferably downstream as illustrated but may be upstream, of the pressure regulating valve 15, where provided. The ambient air inlet valve 14 may include the functionality of the pressure reducing valve 15 thereby to maintain a low parts count.

When the system 1 is operating in the second mode when the cooling loop 3 is open, the ambient air inlet valve ambient air inlet valve 14 provides for the admission of a volume of ambient air into the cooling loop 3. This volume of ambient air will in general be cooler than the engine bleed air and/or supplied by an APU at the inlet I and although at ambient pressure, the cooling requirement from the system 1 when operating in the second mode, usually when the aircraft 5 is on the ground, will be reduced, thereby increasing the cooling efficiency of the system 1.

As a more adequate supply of pressurised air at the inlet I becomes available, e.g. as engine speed increases prior to take off, the mode valve 14 is closed, progressively possibly, and the ambient air inlet valve 19 will be closed to so that the system 1 again operates with a closed cooling loop 3.

The intercooler apparatus 8 in this example includes a ram air intercooler 25 which is a heat exchanger in which compressed and hot air from the compressor 6 is cooled by cooler ram air caused to flow through the heat exchanger 25 by the motion of the aircraft 5 through the air. Further the intercooler apparatus 8 includes a further stage heat exchanger 26 in which coolant is provided by air which has been used to cool another heat load, in this case the aircraft cabin 27, the aircraft cabin 27 itself having been cooled by cool and expanded air from the power turbine 22 which is passed to the cabin 27 via a line 28. The cabin 27 may be by-passed by the cooled and expanded air from the power turbine 22 passing direct to the intercooler apparatus 8 via a by-pass line 30.

In another arrangement, the ram air intercooler 25 and/or the heat exchanger 26 for the cooled and expanded air from the power turbine 22 may be omitted so that the intercooler apparatus 8 is a single stage intercooler apparatus 8.

The pre-cooler apparatus 11 includes in this example, a ram air pre-cooler 32 similar to the ram air intercooler 25, and a heat exchanger 33 for the inlet air I in which the coolant is again air which has been cooled and expanded over the power turbine 22, albeit that the coolant for the pre-cooler heat exchanger 33, has in this example been used in the intercooler apparatus 8, or at least a proportion of it is so used, and thus heated, but the air will still be cooled than the air at inlet I.

Various modifications may be made without departing from the scope of the invention. It is to be understood that the present invention is not necessarily limited to a system 1 having all the features of the embodiments described in this specification.

In another embodiment, to provide extra drive power to drive the cooling turbine 4 and compressor 6 in the cooling loop 3, an alternative driving device to the power turbine 22 may be provided, such as a prime mover.

The control valve 10, the mode valve 14 and the ambient air inlet valve 19, as well as any other valves such as valve 34 which controls the cabin bypass flow etc. may be controlled by a system controller which may be computer operated to take into account parameters such as pressurised air inlet temperature and pressure, ambient air temperature and pressure, air speed, the magnitude of the heat load 2 and cabin 27 temperature to be cooled and the desired temperatures, to operate the system 1 to achieve adequate cooling/ heating of the conditioned air. The system 1 may include one or more water separators to remove any liquid water from the conditioned air, particularly after expansion over the cooling turbine 4 and/or the power turbine 22, and to achieve a desired humidity of conditioned air.

What is claimed is:

1. An environmental control including a power turbine over which, in use, high pressure air from a pressurized air supply is passed, the power turbine driving a compressor, a cooling turbine over which compressed air is expanded and cooled, an intercooler apparatus for cooling air compressed by the compressor prior to the air being expanded and cooled over the cooling turbine, and a heat exchanger to which at least a proportion of the cooled and expanded air from the cooling turbine is fed to cool a heat load, and wherein the system is operable in each of first and second modes of operation, during each of which the compressor is driven by the high pressure air passing over the power turbine, and in the first mode of operation, there is a closed cooling loop around which the air circulates from the compressor to the intercooler apparatus to the cooling turbine, and thence to the heat exchanger, and back to the compressor, and in the second mode of operation the cooling loop is open to allow air to pass from the system whilst further air is introduced into the cooling loop, and wherein an ambient air inlet valve is provided to provide for the admission of ambient air to the cooling loop, when the system is operating in-the-second mode of operation.

2. A system according to claim 1 wherein the system includes a pressure regulating valve between the cooling loop and a high pressure inlet for air, the pressure regulating valve permitting the introduction of high pressure air into the cooling loop when the pressure in the cooling loop is below a predetermined pressure.

3. A system according to claim 2 wherein the ambient air inlet valve is provided downstream of the pressure regulating valve.

4. A system according to claim 1 wherein the cooling loop is closed and opened by a mode valve in the cooling loop.

5. A system according to claim 4 wherein the ambient air inlet valve is provided upstream of the mode valve.

6. A system according to claim 1 wherein the system includes a pressure regulating valve between the cooling loop and an inlet for high pressure air, the pressure regulating valve permitting the introduction of high pressure air into the cooling loop when the pressure in the cooling loop is below a predetermined pressure the ambient air inlet valve is provided downstream of the pressure regulating valve, and wherein the cooling loop is closed and opened by a mode valve in the cooling loop, the ambient air inlet valve being provided upstream of the mode valve.

7. A system according to claim 1 wherein the system includes a driving device to provide additional drive power to drive the compressor.

8. A system according to claim 7 wherein the driving device is a power turbine over which high pressure air is passed, the power turbine and the cooling turbine and the compressor being provided on a common shaft and being rotatable together.

9. A system according to claim 8 wherein the system includes a pressure regulating valve between the cooling loop and a high pressure inlet for air, the pressure regulating valve permitting the introduction of high pressure air into the cooling loop when the pressure in the cooling loop is below a predetermined pressure, high pressure air for the power turbine being provided to the power turbine from upstream of the pressure regulating valve.

10. A system according to claim 8 wherein cooled and expanded air from the power turbine is fed to the intercooler apparatus to cool compressed air in the cooling loop.

11. A system according to claim 10 wherein the intercooler apparatus includes a ram air heat exchanger for cooling the compressed air.

12. A system according to claim 8 wherein cooled and expanded air from the power turbine is fed to a pre-cooling apparatus to pre-cool high pressure air from an inlet for high pressure air to the system.

13. A system according to claim 12 wherein the pre-cooling apparatus includes a ram air heat exchanger.

14. A aircraft including an environmental control system including a power turbine over which, in use, high pressure air from a pressurized air supply is passed, the power turbine driving a compressor, a cooling turbine over which compressed air is expanded and cooled, an intercooler apparatus for cooling air compressed by the compressor prior to the air being expanded and cooled over the cooling turbine, and a heat exchanger to which at least a proportion of the cooled and expanded air from the cooling turbine is fed to cool a heat load, and wherein the system is operable in each of first and second modes of operation, during each of which the compressor is driven by the high pressure air passing over the power turbine, and in the first mode of operation, there is a closed cooling loop around which the air circulates from the compressor to the intercooler apparatus to the cooling turbine, and thence to the heat exchanger, and back to the compressor, and in the second mode of operation the cooling loop is open to allow air to pass from the system whilst further air is introduced into the cooling loop, and wherein an ambient air inlet valve is provided to provide for the admission of ambient air to the cooling loop, when the system is operating in the second mode of operation.

* * * * *